(12) United States Patent
Krishnareddy et al.

(10) Patent No.: US 9,947,014 B2
(45) Date of Patent: Apr. 17, 2018

(54) DETERMINATION AND MONETIZATION OF FUTURE LOCATION

(75) Inventors: Suresh Kumar Krishnareddy, Bangalore (IN); Ashootosh Chand, Bangalore (IN)

(73) Assignee: Excalibur IP, LLC, Sunnyvale, CA (US)

( * ) Notice: Subject to any disclaimer, the term of this patent is extended or adjusted under 35 U.S.C. 154(b) by 477 days.

(21) Appl. No.: 13/175,185

(22) Filed: Jul. 1, 2011

(65) Prior Publication Data

US 2013/0006777 A1    Jan. 3, 2013

(51) Int. Cl.
*G06Q 30/00* (2012.01)
(52) U.S. Cl.
CPC .................. *G06Q 30/00* (2013.01)
(58) Field of Classification Search
CPC .............................................. G06Q 30/0241
USPC ............................................... 705/14.58, 14
See application file for complete search history.

(56) References Cited

U.S. PATENT DOCUMENTS

| | | | | |
|---|---|---|---|---|
| 5,978,770 A * | 11/1999 | Waytena | ............... | G06Q 10/02 705/5 |
| 6,571,279 B1 * | 5/2003 | Herz et al. | ............... | 709/217 |
| 7,284,033 B2 * | 10/2007 | Jhanji | ............... | 709/206 |
| 7,533,032 B1 * | 5/2009 | Selby | ............... | G06Q 10/02 705/5 |
| 7,962,361 B2 * | 6/2011 | Ramchandani et al. | ... | 705/14.25 |
| 8,031,595 B2 * | 10/2011 | Hamilton et al. | ............. | 370/230 |
| 9,277,365 B1 * | 3/2016 | Wilden | ............... | H04W 4/028 |
| 2006/0053057 A1 * | 3/2006 | Michael | ............... | 705/14 |
| 2012/0054337 A1 * | 3/2012 | Moritz | ............... | H04W 4/02 709/224 |
| 2012/0158289 A1 * | 6/2012 | Bernheim Brush | ............... | G01C 21/3484 701/425 |
| 2012/0253855 A1 * | 10/2012 | Chand | ............... | G06Q 30/0261 705/5 |
| 2012/0253935 A1 * | 10/2012 | Blom | ............... | 705/14.58 |
| 2012/0259704 A1 * | 10/2012 | Monteverde | ............... | 705/14.58 |
| 2012/0266191 A1 * | 10/2012 | Abrahamsson et al. | ........ | 725/35 |

* cited by examiner

*Primary Examiner* — Matthew L Hamilton
(74) *Attorney, Agent, or Firm* — Brinks Gilson & Lione

(57) ABSTRACT

A computer-implemented method for monetizing future location of users includes identifying indicator(s) retrieved from log data or an electronic declaration that indicate a possibility that a user will be at a specific location in the future; generating a probability that the user will be at the specific location in the future based on the indicator(s); and charging an advertiser a cost for an impression to which to serve a location-specific advertisement targeted to the user, the cost charged being greater when the probability is greater that the user will be at the specific location in the future. The method may be extended to targeting a group of users that expect to be at the same location at the future point in time. Monetization of future locations may depend on the quality and/or quantity of the log data and declarations of future locations and on a number of users in a group of users if monetized according to the group.

11 Claims, 4 Drawing Sheets

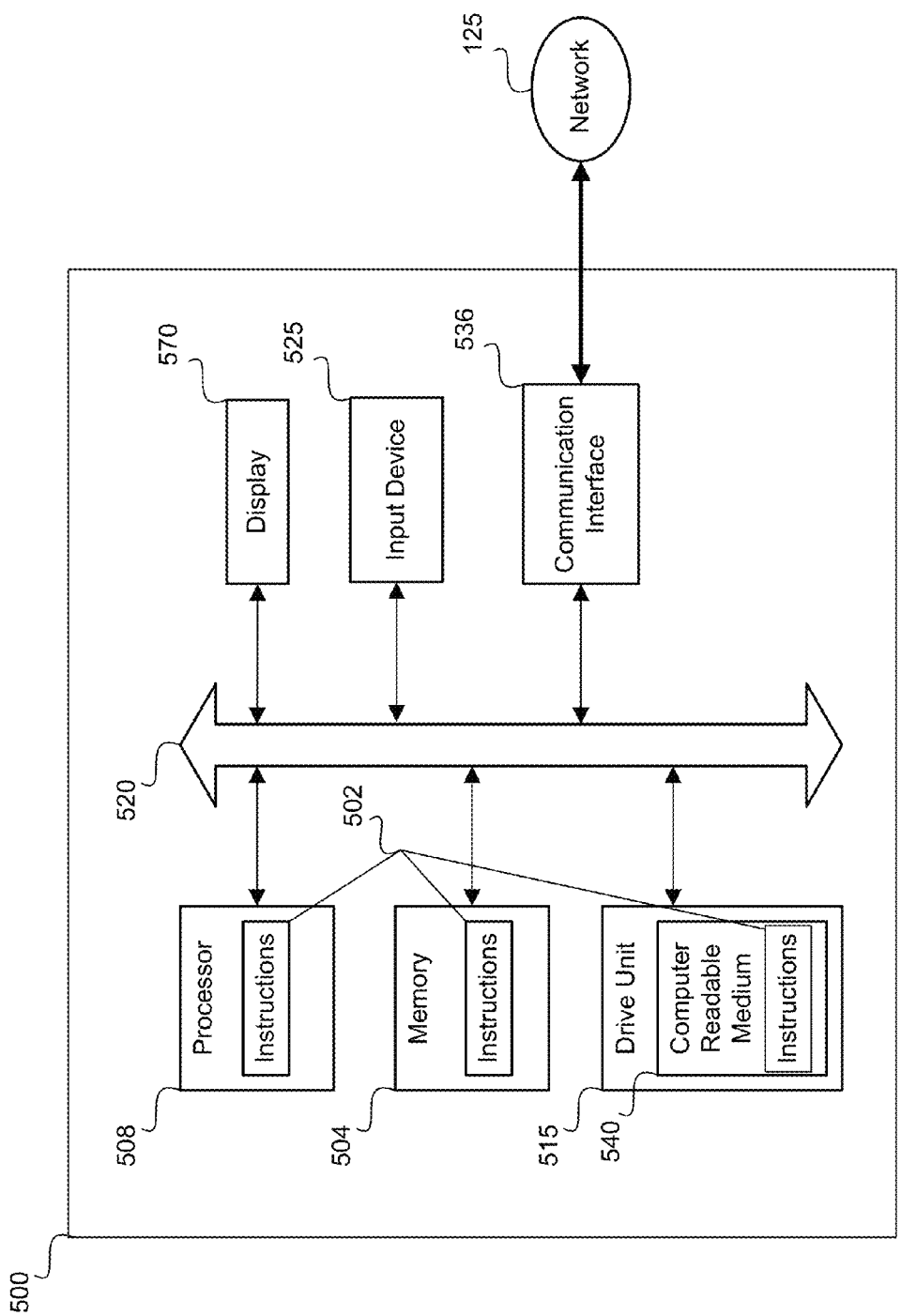

DETERMINATION AND MONETIZATION OF FUTURE LOCATION

BACKGROUND

1. Technical Field

The disclosed embodiments relate to systems and methods for determining future locations of users, and more particularly, monetizing such future locations with advertisements targeted to users based on their future locations.

2. Related Art

Internet advertising is a multi-billion dollar industry and is growing at double digit rates in recent years. It is also the major revenue source for internet companies such as Yahoo!® that provide advertising networks that connect advertisers, publishers, and Internet users. As an intermediary, these companies are also referred to as advertiser brokers or providers. New and creative ways to attract attention of users to advertisements ("ads") or to the sponsors of those advertisements help to grow the effectiveness of online advertising, and thus increases the growth of sponsored and organic advertising. Publishers partner with advertisers, or allow advertisements to be delivered to their web pages, to help pay for the published content, or for other marketing reasons.

Social networking has also blossomed and provides a unique, relatively new source of advertising. Social networking sites can obtain information about its users that is more plentiful and easier to track and put to use compared to times before social media. This information can be leveraged to better target advertising to social media users that they are more likely to be interested in, making the advertising experience more enjoyable for the users and more profitable for the advertisers.

Furthermore, the popularity of location-based applications and advertising has grown over recent years such that advertisements and/or search results are delivered to users at least in part dependent on their locations. It may be difficult, however, to know with much certainty where a user plans to be located in the future such as to target advertising based on something other than current location.

BRIEF DESCRIPTION OF THE DRAWINGS

The system may be better understood with reference to the following drawings and description. The components in the figures are not necessarily to scale, emphasis instead being placed upon illustrating principles. In the figures, like referenced numerals may refer to like parts throughout the different figures unless otherwise specified.

FIG. 5 illustrates a general computer system, which may represent any of the computing devices referenced herein.

DETAILED DESCRIPTION

By way of introduction, the disclosed embodiments relate to a system for determining a future location of one or more users and monetizing advertising served to the one or more users based on the future location. The system may identify one or more indicators retrieved from log data or an electronic declaration that indicate a possibility that a user will be at a specific location in the future. The system may also generate a probability that the user will be at the specific location in the future based on the one or more indicators. The system may also charge an advertiser a cost for an impression to which to serve a location-specific advertisement targeted to the user, the cost charged being greater when the probability is greater that the user will be at the specific location in the future. Instead of probabilities, a quality score (or grade) may be generated to qualify a possible future location for a user, where the quality score (or grade) is higher for stronger indicators or better quality data pointing to the possible future location.

In another example, the system may determine a possible future location for two or more users that may attend an event together, for instance, and to monetize advertising targeted to those two or more users based on the future location. The system may identify one or more indicators retrieved from log data or an electronic declaration that indicate a probability that two or more users will be at a specific location at a future point in time. The system may also generate a plurality of quality scores, one for each of at least two of the two or more users, the quality score based on how likely it is that each user will be at the specific location at the future point in time based on the one or more indicators. The system may also determine a cost per user for a group of users in a range of quality score percentiles, the cost per user depending on the range of quality score percentiles of the group and on how many users are in the group.

Figure 1:
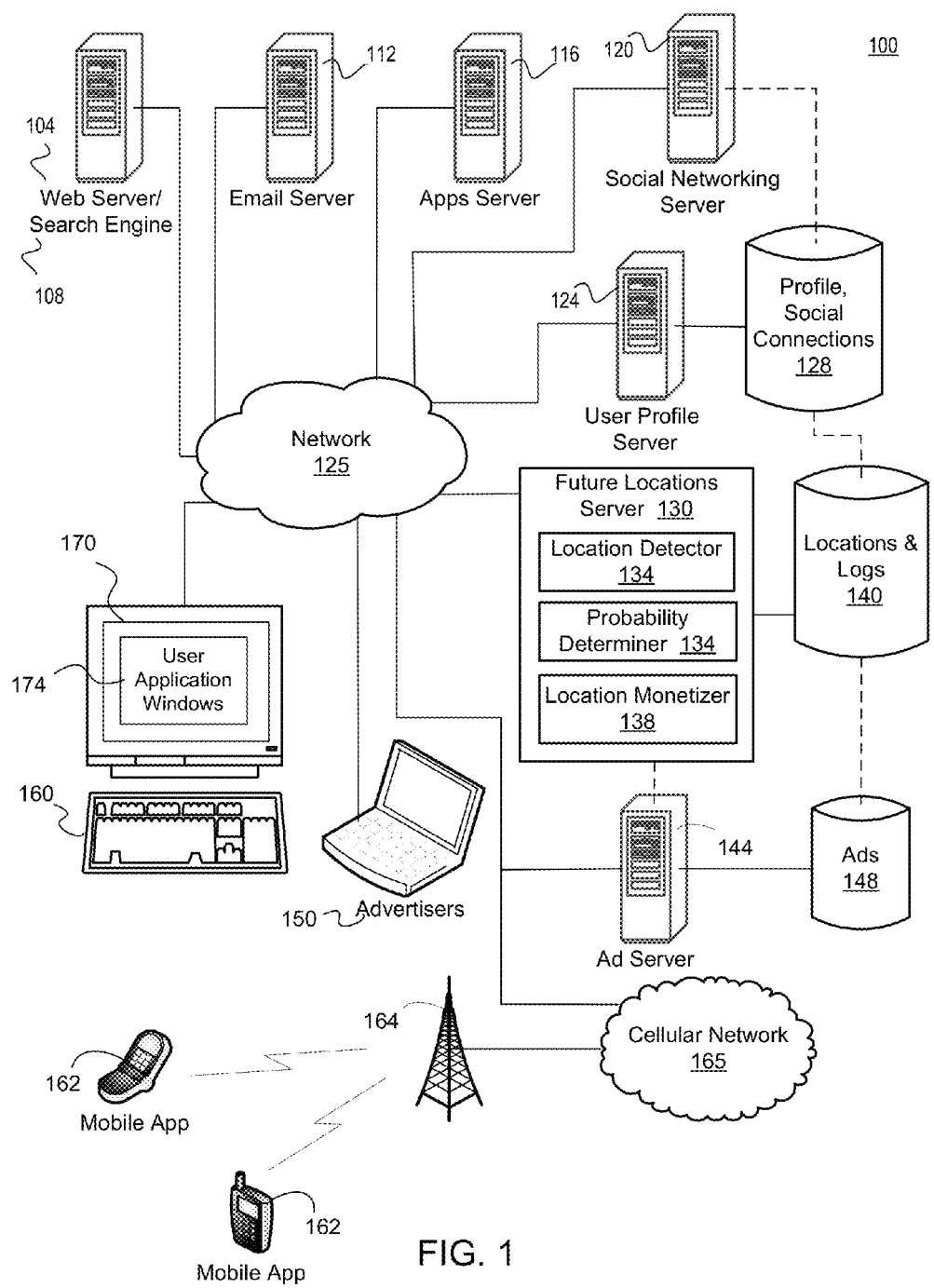
FIG. 1 is a diagram of an exemplary system for determining future locations of users for the purpose of monetizing targeted advertisements based on those locations.

In FIG. 1, an exemplary system 100 for determining future locations of users for the purpose of monetizing targeted advertisements based on those locations may include a number of servers and computing devices. The system 100 may include a web server 104 which may also include or be integrated with a search engine 108, an email server 112, an applications server 116, a social networking server 120, and a user profile server 124. All of these servers may intercommunicate or be coupled with each other through a network 125. Herein, the phrase "coupled with" is defined to mean directly connected to or indirectly connected through one or more intermediate components, including a network. The user profile server 124 may include or be coupled with a profile and social connections database 128 stored in storage memory. The database 128 may be shared with or otherwise be coupled with the social networking server 120, which may generate and track social connections as users create and update their social connections in a social network. A user's profile may include information provided by the user including their likes and dislikes, interests, work history, personal history, and personal connections. The user's profile may also be built from online browsing, searching, and purchasing history of the user. The user's profile and/or social connections may also be stored with other log data, which will be discussed later.

The system 100 may also include a future locations server 130 including a location detector 134, a probability (or quality score) determiner 136, and a location monetizer 138, each of which may play a role in determining and monetizing future locations of users through location-specific targeted advertising to those users based on at least a likelihood that the users will be at those future locations at a future point in time. The future locations server 130 may include or be coupled with a locations and logs database 140 that may include log data such as browsing, searching, purchasing history, user locations and history of locations, as well as declarations of future location in various forms as will be discussed. The system 100 may also include an ad server 144 that may be integrated or be coupled with the future locations server 130. The ad server 144 may include or be coupled with an ads database 148 stored in storage memory of the ad server 144. Accordingly, the dashed line indicates that the ads database 148 and the locations and log database 140 may be combined in one database or may be coupled together, including being shared across the network 125.

The system 100 may also include a plurality of advertiser communication devices 150 through which the advertisers may communicate over—and upload advertisements to— the network 125 to be stored and served from the ad server 144. The system 100 may also include a plurality of user communication devices 160 that may include stationary devices 160 as well as mobile communication devices 162 such as cell phones, tablet and laptop computers, and smart phones, etc. The mobile communication devices 162 may communicate with each other and with the network 125 through a base station 164 such as a cellular tower, and through a cellular network 165 to include various cellular switches and networking devices (not shown). The cellular network 165 may be coupled with the network 125, which may be a wired and/or a wireless network that provides internet connectivity to the mobile devices 162.

The user communication devices 160, including the mobile devices 164, may include a screen or display 170 in which is displayed an application window 174 which may include a browser or other program application. The ad server 144 may serve advertisements ("ads") to application windows 174 or browsers 174 of the user communication devices 160 and 162 and track user interaction with the ads. The ads from the advertiser 150, which may be served from the ads database 148 of the ad server 144, may be served to users in response to a search query submitted to the search engine 108, to a web page the user browses to that is delivered by the web server 104, or served to an email program of the email server 112 or to an application of the applications server 116 that the user accesses over the network 125.

The ads served by the ad server 144 to the users may be targeted to the users based on their future locations, whether as implied in log data, provided as a declaration of an intended future location, or some combination of both. Upon service of an ad, the advertiser 150 of that ad is charged an amount commensurate with a probability that the user (or users) will in fact be in the future location and/or based on a quality score calculated with reference to the types of future location indicators derived from the log data and any declaration(s) of future location. Monetization examples will be covered in detail later and may be executed by the location monetizer 138.

The users may provide declarations of future locations through use of applications such as one of Yahoo!'s properties reachable from Yahoo!'s main page, or through a social networking application such as Twitter or Facebook, for instance. Furthermore, a future location of the user may be determined from one or a combination of the following: a default location that the user personalizes and can update anytime; saved locations affiliated with common locations such as home, work, and school; and queried locations related to one or more database or search engine queries entered by the user.

A default location may be provided in an application such as Places® or other application, such as for a smart phone, for a normal current location. Other common locations may also be saved in some applications such as for home, work, and/or school that can be associated with these terms. These terms may then be compared to social media feeds and associated hits saved as log data that could be indicative of future locations of the user. Queried locations may be tracked with reference to search queries, such as when a user includes the name of a city, state, country, or region in certain queries. These locations within the queries may reference places outside of the user's normal locations and be indicative of an intended future location of that user. Communications with other applications, such as a calendar program, for example, may also provide intentions or declarations of future location. Sending or accepting a calendar invitation for an event may be considered a declaration of a future location.

Figure 2:
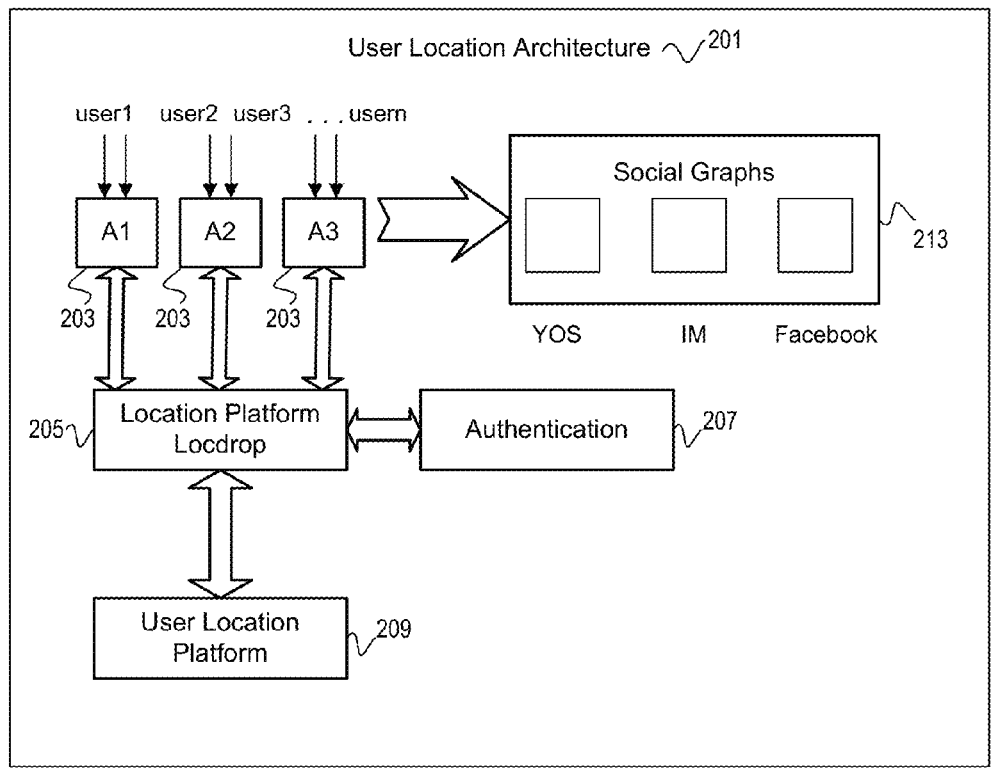
FIG. 2 is a diagram of an exemplary user location architecture executable by a future locations server or ad server configured to determine future locations of users.

FIG. 2 is a diagram of an exemplary user location architecture 201 executable by the future locations server 130 and/or or the ad server 144 configured to determine future locations of users. The users interact with applications or other programs 203 as just discussed, and therefore, need not necessarily be inside of Yahoo!'s network or within their website somewhere. When these users interact with applications that are still detectable by the location detector 134, the users are connected to the future locations server 130 and culled data from those user interactions are stored in the locations and logs database 140 and/or the profile and social connections database 128. The future locations server 130 may then act as a location broker for the larger body of the Web, and external properties or developers may then use the location and logs data in the database 140 for third party applications as well.

The user location architecture 201 may further include a location platform ("Locdrop") 205. The Locdrop 205 may provide a one-stop platform for all location-related storage and to function as a location broker. The Locdrop 205 may store every location such as in the locations and log database 140, which may provide high data availability for quick, real-time computations on exact location query. The Locdrop 205, together with an authentication module 207, may also take care of authentication of both internal and external users, applications, and query requirements. The user location architecture 201 may further include a user location platform 209, a hosted application that extracts location information from a collection of input data and returns abstract location data suitable for geo-targeting and geo-tagging, thus augmenting log data and declarations with actual geo-locations suitable for targeting by advertisements.

The user location architecture 201 may also include a social graphs widget 213 through which to build end user graphs and associated applications and/or user scenarios around complete user location information for specific users. The Social graphs widget 213 may enable users to optionally maintain and manage their own location and social connection information.

The quality of a future location may be attributed to a source or a combination of sources that go into determining a future location for a user. One way of looking at future location is by probability, e.g., making a probability assessment that a user will be at a future location based on log data and declarations, examples of which were already discussed. The probability may run from one percent (not sure at all) to 100 percent (completely sure). The probability determiner 134 may determine a probability or quality score for a future location for a particular user through a series of rules or attributions applied to the sources of future location data or declarations. Further by way of example, sources of future location may include, but are not limited to, user declarations such as a check-in or a direct input of intended location. The location detector 134 may further detect future locations from flight bookings, hotel bookings, rental car bookings, or any other such bookings, such as for a venue. Sources of future location may also come from social connections or social networks and may include data monitored in posts of the user or in posts of a friend of a user, or even in posts of a friend of a friend of a user. Discussions among friends or declarations of future locations from which to determine future location may include activities or events to which users plan to attend. A user's past behavior on a network or a user location-based history are further sources of future location for a user.

The quality of these sources may be assessed in advance and provided levels on which to build a probability or quality score for a future location for a user. For instance, data from browsing or search (data) logs may receive a relatively low probability, although different instances of location-based data that confirm a future location for a user may be added together to generate a higher probability. Furthermore, a logged-in user may receive yet a higher probability because the information entered by the user is current and more likely to be accurate. As a further example, a user that has a history of adherence to declarations of future location may receive a higher score or probability affiliated with a new declaration of—or other data related to—a future location based on credibility, e.g., how much the system 100 trusts what the user says. A past known location for a user in conjunction with current future location data may be given higher probability or quality scores. As a further example, a user for which is already stored another future location, and combined with a current location, may provide a relatively strong indication of a future location that is consistent with the stored current and future locations. For instance, it is unlikely that a user in Singapore right now will be Los Angeles, Calif. tomorrow. Finally, direct declarations such as the calendar invite example above or a direct input of a future location into an application, email, or social media post or stream may be given a higher probability of being correct. Table 1 summarizes these examples, providing a base probability, a total probability available, and a maximum grade for corresponding location-based sources.

TABLE 1

| User Location Actions | Base Probability | Total Probability | Max Grade |
|---|---|---|---|
| Location System detects Users' Possible Future Location from Logs | 0.1 | 0.1 | C |
| User = Logged Into Yahoo! Network | 0.1 | 0.2 | B |
| Future Location, User Credibility | 0.1-0.7 | 0.1-1.0 | A |
| Based on Current and other Future Locations | 0.1-0.7 | 0.1-0.9 | A |
| Past Locations or Location History | 0.1-0.8 | 0.1-1.0 | A |
| User Declares Future Location | 0.1-1.0 | 0.1-1.0 | A |

While the first-listed example in Table 1 mentions logs, the credibility and history-based data may also come from logs and be factored into the probability analysis. The quality score or probability that a user will be at a specific location in the future may also be impacted based on the following factors. A quality score may also be higher based on a current location of the user that is closer to the specific location as compared with being farther away. A quality score may also be higher based on a past history of the user frequenting the specific location as compared with a history of rarely visiting the specific location. A quality score may be higher based on one or more declarations of future location that is within a predetermined distance of the specific location as compared with an absence of, or fewer, declarations of future location within the predetermined distance of the specific location. A quality score may also be higher where the declaration of future location comprises the user booking one or a combination of a hotel room, an airline ticket, and a venue at or near the specific location, the quality score increasing with the number of bookings. The quality score may also be higher for a declaration of future location of a close friend of the user in a social network when compared with a friend of a friend.

To provide an example, imagine finding searches or browsing actions conducted by a user from Concord, N.H. for hotels and attractions in the Orlando, Fla. area. It is now the middle of March. Each separate search or browsing actions garners a 0.1 probability, which accumulates over a period of a few days. Suppose that this brings the probability of a future location of Orlando, Fla. for the user to 0.2, or a 20% chance. Suppose, furthermore, that location history for the user indicates that the user spent vacation each of the last two years at Disneyland in Anaheim, Calif. during the first week of April. This data may increase the probability of a future location of Anaheim, Calif., the home of Disney World, to about 50%. If the system 100 has a threshold set at about 50%, the ad server 144 may deliver targeted ads to the user. If the system 100 has a higher threshold probability for delivering ads such as 80%, the ad server 144 may wait for additional indications of a future location. Suppose that the user next books a flight to Orlando, Fla. and a hotel room in or near Orlando, Fla. This would likely bring the probability of a future location of Orlando, Fla. to 100% (or 1.0), or close to it. The ad server 144 would then serve (or continue to serve) advertisements related to attractions, restaurants, and the like in the Orlando Fla. area to the user.

A service provider or publisher such as Yahoo!® that provides ad impressions to be filled by the advertisers 150 may then charge advertisers a cost for each impression to which to serve a location-specific advertisement targeted to the user based on a probability that the user will be in a specific location at some future point in time. The service provider may charge more when the probability is higher and optionally also when the expected time frame for the visit to the future location is in the near future. This monetization, executable by the location monetizer 138, may be based on delivery of an ad to a single user or to a group of users, for instance to a group of socially-connected users. With reference to targeting a single user, an ad rate can be charged based on the probability or a quality score with reference to a future location of that user. Table 2 includes an example of monetization of future location with reference to a single user.

TABLE 2

| Quality Score | $ Value/Single User (1) | $ Value/Single User (2) |
|---|---|---|
| >95% | 8 | 4 |
| >75%-95% | 5 | 1 |
| >50%-75% | 2 | 0.50 |
| >25%-50% | 1 | 0.25 |
| <25% | 0.5 | 0.10 |

Note that the quality score column of Table 2 is expressed in probability that the user will be located at the specific location in the future. The second and third columns of Table 2 respectively are different embodiments of values per impression for a single user depending on in what probability range the quality score resides.

Table 3 includes an example of monetization of future location with reference to a single user, but where advertisers are allowed to bid on different ranges of quality and quantity of future locations in an auction. The first column shows how many future locations reside in the quality score range of the second column, and thus provides additional context for how many user impressions the advertiser is to receive. The future location grade is a grade determined based at least in part on the quality score and optionally including consideration for the number of future locations. The results in cost charged per impression for the users in each category apply to the advertiser that wins the auction.

TABLE 3

| No. Future Locations | Quality Score (Probability) | Future Location Grade | $ Value/User |
|---|---|---|---|
| 10K | >95% | A | 5.0 |
| 20K | >75%-95% | B | 2.0 |
| 30K | >50%-75% | C | 1.0 |
| 50K | >25%-50% | D | 0.50 |
| 100K | <25% | E | 0.10 |

With reference to targeting a group of two or more users, an incremental ad rate per user can be charged based on the probability or a quality score with reference to a future location for the group of users—or each user in the group of users—as well as how many users are in the group. A charge to an advertiser may thus be calculated as the ad rate times the number of users to which the location-specific advertisement will be targeted. Groups may be determined based on residing in the same range of quality score probabilities or based on being affiliated with a group of users that have planned a trip together. For instance, a group of employees or friends that are socially or professionally connected such as through the social networking server 120 may be affiliated with each other when they book a vacation or business trip as a group. Table 4 show examples of monetization of future locations with reference to a group of two or more users executable by the location monetizer 138. If the group of users that are connected in social networking booked or prepared to be at the same or similar location together, they can all be targeted together based on mutual interest.

TABLE 4

| Quality Score | $ Value/User in Group | # of Users | $ Value/Group |
|---|---|---|---|
| >95% | 8 | 15 | 120 |
| >75%-95% | 6 | 20 | 120 |
| >50%-75% | 3 | 30 | 90 |
| >25%-50% | 2 | 25 | 50 |
| <25% | 1 | 10 | 10 |

Figure 3:
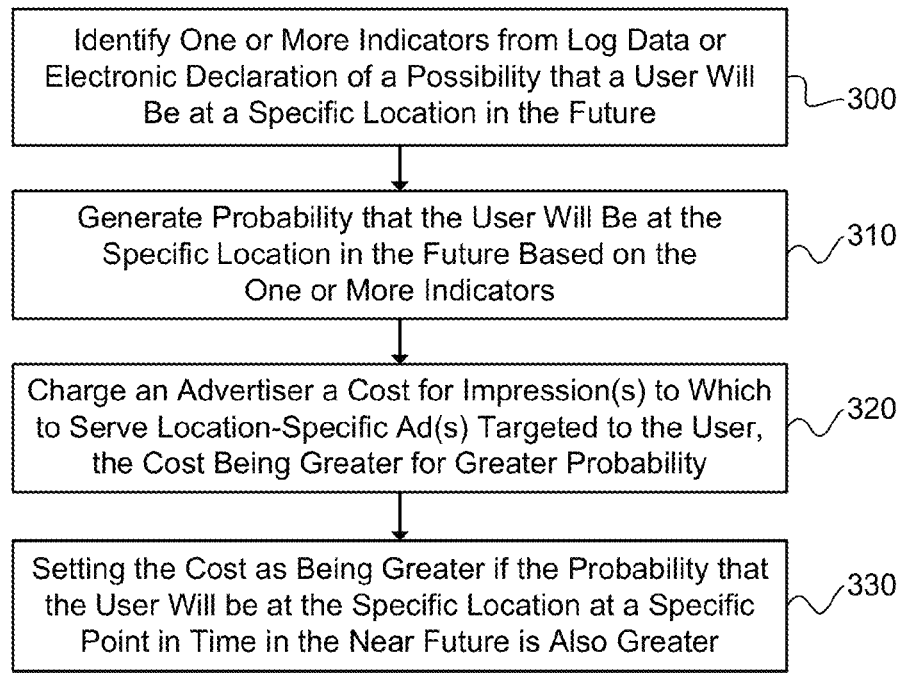
FIG. 3 is a flow chart of a method for determining and monetizing a future location of a user.

FIG. 3 is a flow chart of a method for determining and monetizing a future location of a user, the method executable by a computing device or system such as disclosed with reference to FIGS. 1-2 and 5. The method, at block 300, includes identifying one or more indicators retrieved from log data or an electronic declaration that indicate a possibility that a user will be at a specific location in the future. The method, at block 310, includes generating a probability that the user will be at the specific location in the future based on the one or more indicators. The method, at block 320, charges an advertiser a cost for an impression to which to serve a location-specific advertisement targeted to the user, the cost charged being greater when the probability is greater that the user will be at the specific location in the future. The method, at block 330, may also include setting the cost even higher if the probability that the user will be at the specific location at a specific point in time in the near future is also high.

Figure 4:
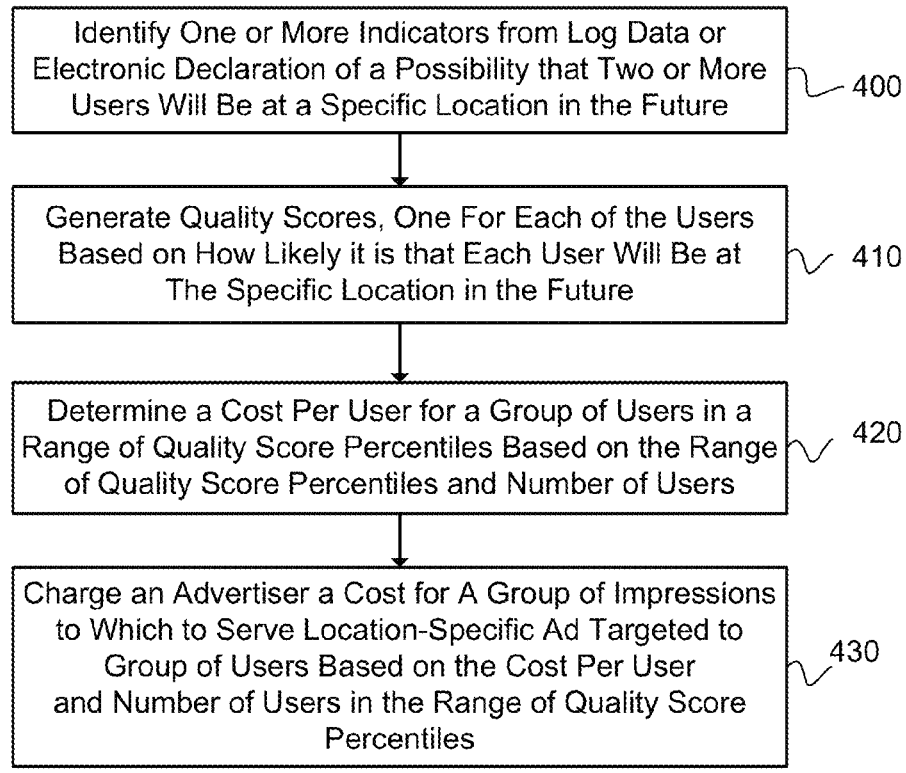
FIG. 4 is a flow chart of a method for determining and monetizing a future location of two or more users.

FIG. 4 is a flow chart of a method for determining and monetizing a future location of two or more users, the method executable by a computing device or system such as disclosed with reference to FIGS. 1-2 and 5. The method, at block 400, includes identifying one or more indicators retrieved from log data or an electronic declaration that indicate a probability that two or more users will be at a specific location at a future point in time. The method, at block 410, includes generating a plurality of quality scores, one for each of at least two of the two or more users, the quality scores based on how likely it is that each user will be at the specific location at the future point in time based on the one or more indicators. The method, at block 420, includes determining a cost per user for a group of users in a range of quality score percentiles, the cost per user depending on the range of quality score percentiles of the group and on how many users are in the group. The method, at block 430, may also include charging an advertiser a cost for a group of impressions to which to serve a location-specific advertisement targeted to the group of users, the cost charged being greater when the quality score percentiles in the range of quality score percentiles are greater and also when the number of users in the group of users is greater.

FIG. 5 illustrates a general computer system 500, which may represent the web server 104, the search engine 108, the applications server 116, the social networking server 120, the user profile server 124, the future locations server 130, the ad server 144, or any other computing devices referenced herein or that may be executed by the system 100, such as, for instance, the communications devices of the advertisers 150 and the user communication devices 160, 162, whether fixed or mobile. The computer system 500 may include an ordered listing of a set of instructions 502 that may be executed to cause the computer system 500 to perform any one or more of the methods or computer-based functions disclosed herein. The computer system 500 may operate as a stand-alone device or may be connected, e.g., using the network 125, to other computer systems or peripheral devices.

In a networked deployment, the computer system 500 may operate in the capacity of a server or as a client-user computer in a server-client user network environment, or as a peer computer system in a peer-to-peer (or distributed) network environment. The computer system 500 may also be implemented as or incorporated into various devices, such as a personal computer or a mobile computing device capable of executing a set of instructions 502 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions.

The computer system 500 may include a memory 504 on a bus 520 for communicating information. Code operable to cause the computer system to perform any of the acts or operations described herein may be stored in the memory 504. The memory 504 may be a random-access memory, read-only memory, programmable memory, hard disk drive or any other type of volatile or non-volatile memory or storage device.

The computer system 500 may include a processor 508, such as a central processing unit (CPU) and/or a graphics processing unit (GPU). The processor 508 may include one or more general processors, digital signal processors, application specific integrated circuits, field programmable gate arrays, digital circuits, optical circuits, analog circuits, combinations thereof, or other now known or later-developed devices for analyzing and processing data. The processor 508 may implement the set of instructions 502 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 500 may also include a disk or optical drive unit 515. The disk drive unit 515 may include a computer-readable medium 540 in which one or more sets of instructions 502, e.g., software, can be embedded. Further, the instructions 502 may perform one or more of the operations as described herein. The instructions 502 may reside completely, or at least partially, within the memory 504 and/or within the processor 508 during execution by the computer system 500. Accordingly, the databases 128, 140, and 148 described above in FIG. 1 may be stored in the memory 504 and/or the disk unit 515.

The memory 504 and the processor 508 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 500 may include an input device 525, such as a keyboard or mouse, configured for a user to interact with any of the components of system 500. It may further include a display 570, such as a liquid crystal display (LCD), a cathode ray tube (CRT), or any other display suitable for conveying information. The display 570 may act as an interface for the user to see the functioning of the processor 508, or specifically as an interface with the software stored in the memory 504 or the drive unit 515.

The computer system 500 may include a communication interface 536 that enables communications via the communications network 125. The network 125 may include wired networks, wireless networks, or combinations thereof. The communication interface 536 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

As discussed above, the system serves advertisements and interfaces that convey additional information related to the advertisement. For example, the system generates browser code operable by a browser to cause the browser to display a web page of information that includes an advertisement. The advertisement may include a graphical indicator that indicates that the advertisement is associated with an interface that conveys additional information associated with the advertisement. The browser code is operable to cause the browser to detect a selection of the graphical indicator, and display the interface along with the information displayed on the web page in response to the selection of the graphical indicator. The advertisement and the additional information conveyed via the interface are submitted by an advertiser during an advertisement submission time.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A method comprising:
controlling a communication interface to access, through a communication network, a log database storing user future location information obtained from a social networking application platform presented as a graphical user interface running on a mobile device corresponding to a user, wherein the user future location information corresponds to a declaration by the user on the social networking application platform of an intended future location at a specific location and at a certain time;
receiving, through the communication interface communicating via the communication network, the user future location information from the log database;

controlling the communication interface to access, through the communication network, a social networking database storing past online activity information of the user;

receiving, through the communication interface communicating via the communication network, the past online activity information of the user from the social networking database;

identifying, by a processor, a current location of the user;

generating a prediction including a quality score, by the processor, that identifies a probability the user will be located at the specific location at the certain time based on the past online activity information of the user, the user future location information, and the current location;

selecting, by the processor, a location-relevant advertisement based on the prediction;

delivering, by the processor, the location-relevant advertisement to an application running on the mobile device of the user;

tracking, by the processor, user interactions with the location-relevant advertisement reported by the application running on the mobile device of the user; and assigning, by the processor, an impression cost to an advertiser of the location-relevant advertisement based on the prediction, wherein the impression cost increases when the prediction probability increases.

2. The method of claim 1, wherein the user future location information comprises detecting the user sending or accepting a calendar invitation for an event at the specific location through an application platform.

3. The method of claim 1, wherein the generating the prediction that the user will be at the specific location at the certain time is further based on one or more activities or events in which the user has made plans to participate through an application platform.

4. The method of claim 1, wherein the generating the prediction that the user will be at the specific location at the certain time is further based on the user booking one or more services selected from a group comprising of a hotel room, an airline ticket, and a venue at the specific location, the prediction probability increasing when more than one service is booked.

5. The method of claim 1, further comprising, receiving, tithe processor, online activity of the user that includes:
a default location by the user;
saved locations affiliated with common locations selected from a group including at least one of home, work, or school; and
queried locations related to one or more database or search engine queries entered by the user.

6. A system, comprising:
a processor; and
a communication interface configured to access a social networking database storing past online activity information and configured to access a log database storing user future location information obtained from a social networking application platform presented as a graphical user interface running on a mobile device corresponding to a user, wherein the user future location information corresponds to a declaration by the user on the social networking application platform of an intended future location at a specific location and at a certain time; and wherein the processor is configured to:
control the communication interface to receive the past online activity information and the user future location information;
identify a current location of the user;
generate, a prediction including a quality score identifying a probability the user will be located at the specific location at the certain time based on the past online activity information, the user future location information, and the current location;
select a location-relevant advertisement based on the prediction;
deliver the location-relevant advertisement to an application running on the mobile device of the user;
track user interactions with the location-relevant advertisement reported by the application running on the mobile device of the user; and
assign an impression cost to an advertiser of the location-relevant advertisement based on the prediction, wherein the impression cost increases when the prediction probability increases.

7. The system of claim 6, wherein the processor is further configured to generate the prediction based on a past history of the user frequenting the specific location as compared with a history of rarely visiting the specific location.

8. The system of claim 6, wherein the processor is further configured to generate the prediction based on one or more declarations of a future location for the user that are within a predetermined distance of the specific location as compared with an absence of, or fewer, declarations of the future location for the user that are within the predetermined distance of the specific location.

9. The system of claim 8, wherein the declarations of the future location comprises the user booking one or a combination of a hotel room, an airline ticket, and a venue at or near the specific location, the prediction probability increasing with a number of bookings.

10. The system of claim 6, wherein the processor is configured to generate the prediction to identify a higher probability the user will be located at the specific location at the certain time when the specific location corresponds to a declaration of a future location of a close friend of the user in the social networking application platform when compared with a friend of a friend.

11. The system of claim 6, wherein the online activity of the user includes:
a default location updateable by the user;
saved locations affiliated with common locations selected from a group including at least one of home, work, or school; and
queried locations related to one or more database or search engine queries entered by the user.

* * * * *